United States Patent
Ho et al.

(10) Patent No.: US 6,687,254 B1
(45) Date of Patent: Feb. 3, 2004

(54) FLEXIBLE THRESHOLD BASED BUFFERING SYSTEM FOR USE IN DIGITAL COMMUNICATION DEVICES

(75) Inventors: Esmond Ho, Kanata (CA); Tom Davis, Ottawa (CA); Ganti Sudhakar, Nepean (CA); Kostic Predrag, Burnaby (CA); Hossain Pezeshki-Esfahani, Ottawa (CA); Charlie Sabry, Ottawa (CA); Natalie Giroux, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/339,844

(22) Filed: Jun. 25, 1999

(30) Foreign Application Priority Data

Nov. 10, 1998 (CA) .............................................. 2253729

(51) Int. Cl.⁷ .......................... H04L 12/28; H04L 12/56
(52) U.S. Cl. ........................ 370/412; 370/230; 370/231
(58) Field of Search ................................ 370/412, 229, 370/428, 429, 395.42, 230, 230.1, 231, 232, 235, 236, 413, 415; 710/52

(56) References Cited

U.S. PATENT DOCUMENTS 5,999,518 A * 12/1999 Nattkemper et al. ........ 370/258
6,115,748 A * 9/2000 Hauser et al. ............... 709/234
6,219,728 B1 * 4/2001 Yin .............................. 710/52
6,377,546 B1 * 4/2002 Guerin et al. ................ 370/230

* cited by examiner

Primary Examiner—Wellington Chin
Assistant Examiner—Raj Jain
(74) Attorney, Agent, or Firm—Marks & Clerk

(57) ABSTRACT

The method and system for buffering packets such as ATM cells at a queueing point of a device which employs a connection-orientated communications protocol includes the steps of logically partitioning a memory into plural reserved buffer spaces allocated to traffic classes and a shared buffer space available to any connection; determining whether to store or discard a given packet based on predetermined discard criteria; and filling the reserved buffer space to a predetermined state of congestion before storing the given packet in the shared buffer space. Reserved buffer space congestion states are defined with respect to individual connections, groups of connections, and the total capacity of the reserved buffer space itself. Packets are discarded when any, or alternatively a specific combination, of corresponding congestion states occur, and the shared space is congested as well. The system facilitates the balance between the sharing of physical memory resources amongst distinct and various types of traffic flows and the logical isolation thereof.

45 Claims, 6 Drawing Sheets

FLEXIBLE THRESHOLD BASED BUFFERING SYSTEM FOR USE IN DIGITAL COMMUNICATION DEVICES

FIELD OF INVENTION

The invention generally relates to a system for buffering packets in a packet-switched digital communications device. More particularly, the invention relates to a buffering system and related method for use at a queueing point in a communications device which employs a multi-class, connection-orientated, communications protocol such as an asynchronous transfer mode (ATM) communications protocol.

BACKGROUND OF INVENTION

Packet-switching communication devices which effect statistical multiplexing, such as ATM network nodes or switches, typically store in the same memory buffer all packets which need to be transmitted over a given link or line. The amount or size of the memory buffer is fixed, and thus an important issue relates to how the memory should be managed to ensure that traffic flows such as virtual circuit connections are provided with some degree of 'fairness' in the use of this limited resource. The situation is further complicated in ATM networks since a connection can be associated with one of a variety of traffic classes, which have varying QoS requirements, and connections within a particular ATM traffic class can be set up with various cell loss ratios (a QoS characteristic). Thus, the memory should be managed to at least provide minimum guaranteed quality of service (QoS) to the various traffic classes, as well as optimal use of the memory above and beyond the minimum QoS. It should be noted that the memory used in such devices typically tends to be very fast, and very expensive, state-of-the-art devices, thereby precluding the option of merely adding more and more memory.

A common prior art buffer management scheme is to "hard partition" the memory, by allocating one fixed portion of a memory buffer to each traffic class. Thus, when a partition group is full, cells belonging to the corresponding traffic class are discarded. While this approach is easy to implement and can operate very quickly, its primary disadvantage is that buffer space which has been allocated to other traffic classes but otherwise unused at that instant is not employed, such that an opportunity is lost to provide service to that connection above and beyond the minimum QoS guarantee. In effect, hard partitioning the memory makes it difficult to take advantage of the bursty nature of many types of digital communications.

At the other extreme, using a finitely sized memory in an unregulated manner so that it is completely shared amongst the various connections, e.g., on a first-come first-served basis, could lead to starvation situations. This is also due to the bursty nature of digital traffic, which could potentially cause temporary buffer congestion. In addition, it is not possible to prioritize memory use in such a shared buffer system to ensure that minimum QoS guarantees are met for particular types of traffic flows.

Thus, system designers often have to balance the sharing of physical resources between various types of digital traffic and the isolation thereof. On the one hand, it is desired to share the memory buffer as much as possible in order to minimize the cost thereof, on the other hand, it is desired to isolate the flow of one virtual connection or group thereof so as to prevent the impact or influence of same on other virtual connections.

SUMMARY OF INVENTION

The invention seeks to facilitate this balance between the sharing of physical memory resources amongst distinct and various types of traffic flows and the logical isolation thereof. One aspect of the invention provides a buffering system for use in a digital communications device, comprising a memory for storing messages, such as packets or cells, and a controller connected to the memory for determining whether to store or discard messages based on predetermined discard criteria. The controller also includes means for storing messages in the memory and building the requisite queueing structures. In the system, the memory is logically partitioned into plural reserved buffer spaces allocated to predetermined groups of traffic flows (hereinafter "traffic groups") and a shared buffer space. The controller is enabled to logically fill each reserved buffer space up to a predetermined state of congestion before logically storing messages belonging to the corresponding traffic group in the shared buffer space.

In the preferred embodiment, each traffic group is associated with a bound on its utilization of the shared buffer space. The bound includes (a) a limit on an absolute number of messages that a traffic group can store in the shared buffer space, and (b) a threshold relating to a degree of occupancy of the shared buffer space as a whole. The shared buffer space becomes congested when the bound is reached or exceeded. When a reserved buffer space reaches its predetermined state of congestion and the corresponding traffic group experiences shared space congestion, incoming messages associated with that traffic group are discarded. In the preferred embodiment, reserved buffer space congestion is defined relative to a given message, thus it is possible for a reserved buffer space to be filled to capacity yet not be in a state of congestion. In this instance, the controller is enabled to store messages in the shared buffer space.

The preferred embodiment is deployed the context of a connection-orientated communications protocol, such as the ATM protocol, wherein a traffic group comprises a group of virtual circuits associated with a single traffic class (hereinafter "connection group"). (In alternative embodiments traffic groups may comprise other types of digital traffic flows, not necessarily virtual circuits or connections.) Each reserved buffer space is preferably sized to provide a minimum guaranteed quality of service to the corresponding group of virtual connections. Under such circumstances, the shared buffer space can be viewed as an idle resource and the shared space access limit and threshold described above represent mechanisms for prioritizing this resource amongst connection groups and/or their associated traffic classes.

In the preferred embodiment, each connection group is further logically subdivided into one or more sub-groups. Each such sub-group is provisioned with a size threshold for the number of messages that the connections thereof may store in the memory. The reserved buffer space may become congested when the sub-group size threshold associated with a particular message is reached. That particular message may be discarded if the corresponding connection group experiences shared space congestion, otherwise the message may be stored in the shared buffer space. Defining multiple sub-groups within a connection group facilitates the provision of various message loss ratio guarantees since the probability of message loss is dependant upon the probability that the reserved buffer space assigned to the connection group is full (which is static for all subgroups) unioned with the probability that a sub-group size threshold is exceeded (which can be selected per sub-group). Messages which are placed within the shared buffer space thus represent service above the QoS level provided by corresponding reserved buffer space.

The sub-group size thresholds of a given connection group may define in aggregate a logical memory space larger than the physical buffer space allotted to the given connection group. This further enables the buffering system to take advantage of the bursty nature of many types of digital traffic.

In the preferred embodiment, connections within a connection group are also provisioned with a size threshold for the number of messages that may be stored in the memory. The reserved buffer space may become congested when the connection size threshold associated with a particular message is reached. That message may be discarded if the corresponding connection group experiences shared space congestion, otherwise the message may be stored in the shared buffer space. The connection size thresholds facilitate the isolation of non-conformant connection. If desired, connection size thresholds may be dynamically configured to be proportional to the weight of a given connection and inversely proportional to a sum of weights associated with a predefined group of connections having similar quality of service parameters.

In the preferred embodiment, either, or both, of the sub-group and connection size thresholds may apply to define congestion of the reserved buffer space for any given connection group. Thus messages will be discarded if the size threshold of a given connection is reached and/or the size threshold of the corresponding sub-group is reached, provided that shared space congestion is asserted against the corresponding connection group.

According to another aspect of the invention, a buffering system is provided for use in a communications device employing a connection-orientated communications protocol. The system includes a memory for storing digital messages associated with various connections, and a controller connected to the memory for determining whether to store or discard a given message based on predetermined discard criteria. The discard criteria includes the event that a given connection reaches an amount of stored messages equal to a dynamic maximum connection queue depth limit. This limit is proportional to a weight associated with the given connection and inversely proportional to a sum of weights associated with a predefined group of connections. For example, in an ATM system, an unspecified bit rate (UBR) connection has a weight defined by a minimum cell rate (MCR), and the predefined group of connections may include all active UBR connections, or only a subset thereof associated with a particular input or output port.

BRIEF DESCRIPTION OF DRAWINGS

The foregoing and other aspects of these invention will become more apparent from the following description of the preferred embodiments thereof and the accompanying drawings which illustrate, by way of example, the principles of the invention. In the drawings.

DETAILED DESCRIPTION OF PREFERRED EMBODIMENTS

Figure 1:
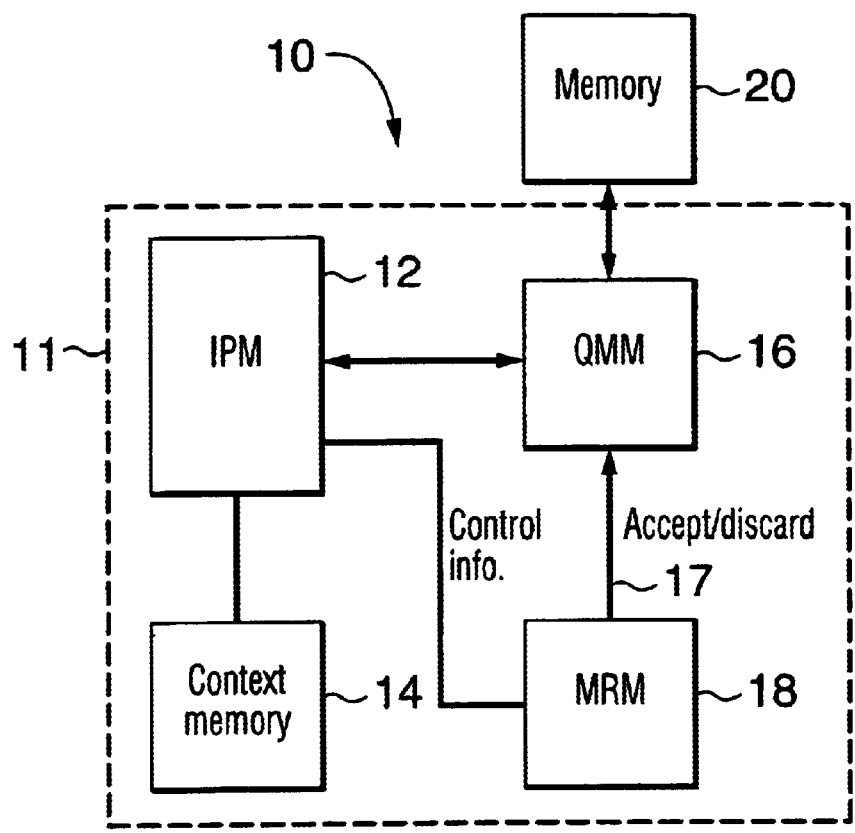
FIG. 1 is a system block diagram of a memory buffer system according to the preferred embodiment.

FIG. 1 is a system block diagram of a buffering system 10 according to the preferred embodiment which comprises a physical memory or buffer 20 for temporarily storing digital messages, such as ATM cells, and a controller 11, for determining whether or not to store a given digital message in the memory based on predetermined congestion criteria. In the preferred embodiment the controller 11 comprises an input processing module (IPM) 12 which is responsible for receiving ATM cells and obtaining control information relating thereto from a context memory 14, as known in the art, per se. The IPM 12 communicates with a queue management module (QMM) 16 and a memory resource manager (MRM) 18. The IPM 12 passes control information pertaining to an incoming cell to the MRM 18. The MRM 18 signals the QMM 16 (via signal 17) whether or not the cell should be accepted and stored in the memory buffer 20 or discarded (i.e., not stored) due to congestion. If the cell is accepted by the controller 11, the QMM 16 is responsible for building and maintaining queues in the memory buffer 20. Thus, the QMM 16 keeps track of the memory location(s) where cells are stored, as well as builds and releases the links between other cells associated with the same virtual connection in order to form a linked list or queue. Cells associated with a given connection may be stored in contiguous or non-contiguous memory locations, so long as a sequential ordering of cells required by connection-orientated ATM systems is maintained by the QMM 16. The system 10 may be employed at a variety of queueing points within an ATM communications device or system. Note that the mechanism for servicing connection queues built in the memory buffer 20 in order to forward cells towards a destination such as an output port is not shown in FIG. 1.

Figure 2:
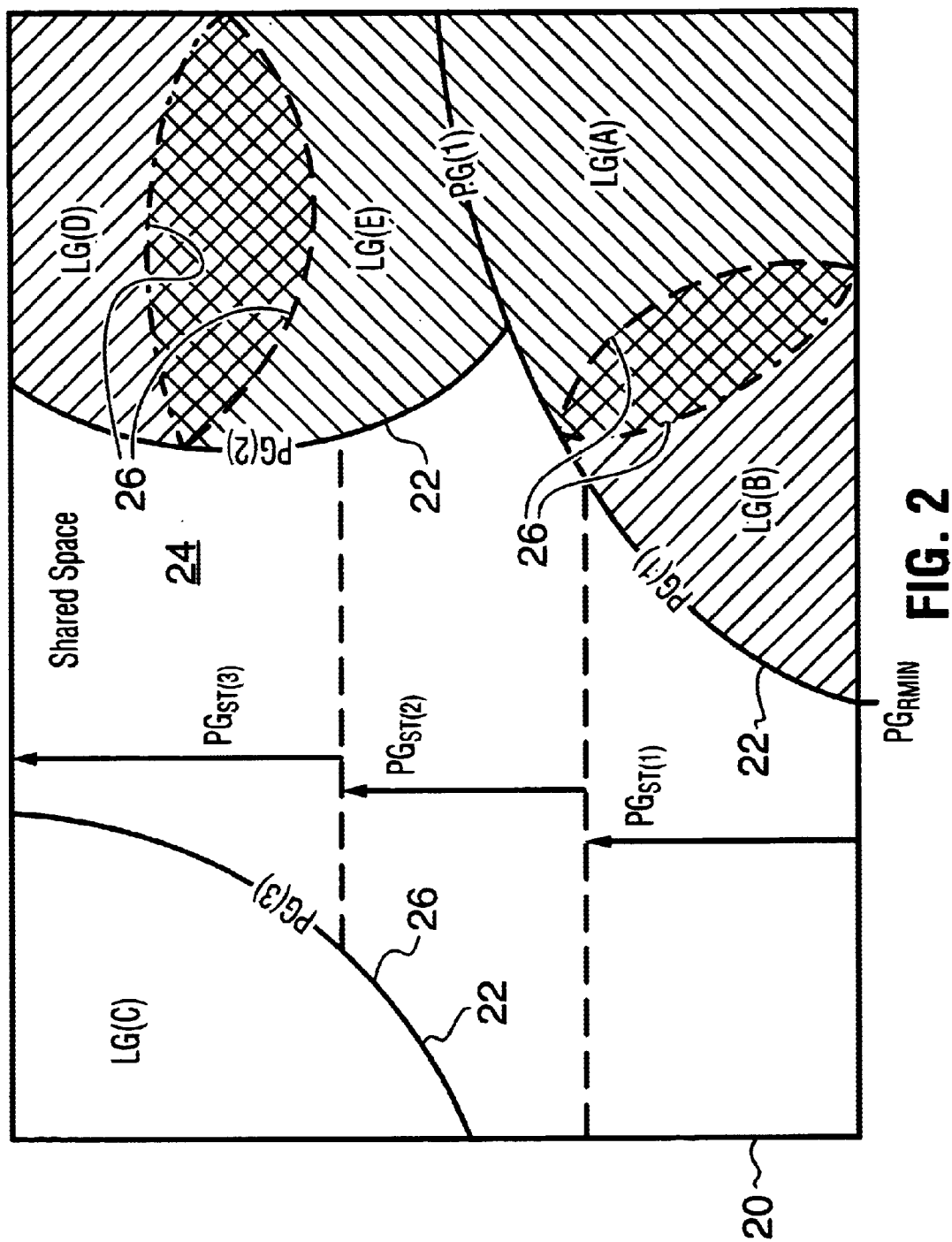
FIG. 2 is a schematic diagram illustrating how a memory buffer is modelled in the preferred system.

FIG. 2 shows how the MRM 18 according to the preferred embodiment models the physical memory buffer 20. The physical memory is logically divided into a plurality of "partition groups" 22 (alternatively abbreviated hereinafter as "PG") and a "shared space" 24 (alternatively abbreviated hereinafter as "SS"). Three partition groups, PG(1), PG(2) and PG(3) are illustrated. Each partition group 22 defines a measure, $PGR_{MIN}$, of buffer space which is reserved only for use by a particular group of connections, as described in greater detail below. The partition groups 22 and shared space 24 are all preferably mutually exclusive or non-overlapping such that there is a one-to-one mapping between the physical memory 20 and the logical buffer space allocated to the partition groups and the shared space.

Each partition group 22 is further logically apportioned into or associated with one or more "loss groups" 26 (alternatively abbreviated hereinafter as "LG"). Five (5) loss groups, LG(A), LG(B), LG(C), LG(D) and LG(E) associated with various partition groups 22 are illustrated. Loss group 26 may be associated with a subset of the connections of the corresponding partition group. Loss groups that belong to the same partition group share the reserved buffer space of the partition group. The loss groups 26 may be sized to logically overlap or intersect one another such that the buffer space defined by all of the loss groups within a particular partition group exceeds the size of the buffer space reserved to that partition group. This overlapping is illustrated, for instance, with respect to LG(A) and LG(B), and LG(D) and LG(E). It should also be noted that 'size' of the loss group 26 may be configured differently depending upon the type of ATM cells which are being controlled. For example, each loss group may be associated with different thresholds (and hence 'sizes') for cells having differing cell loss priority values, as explained in greater detail below.

Figure 3:
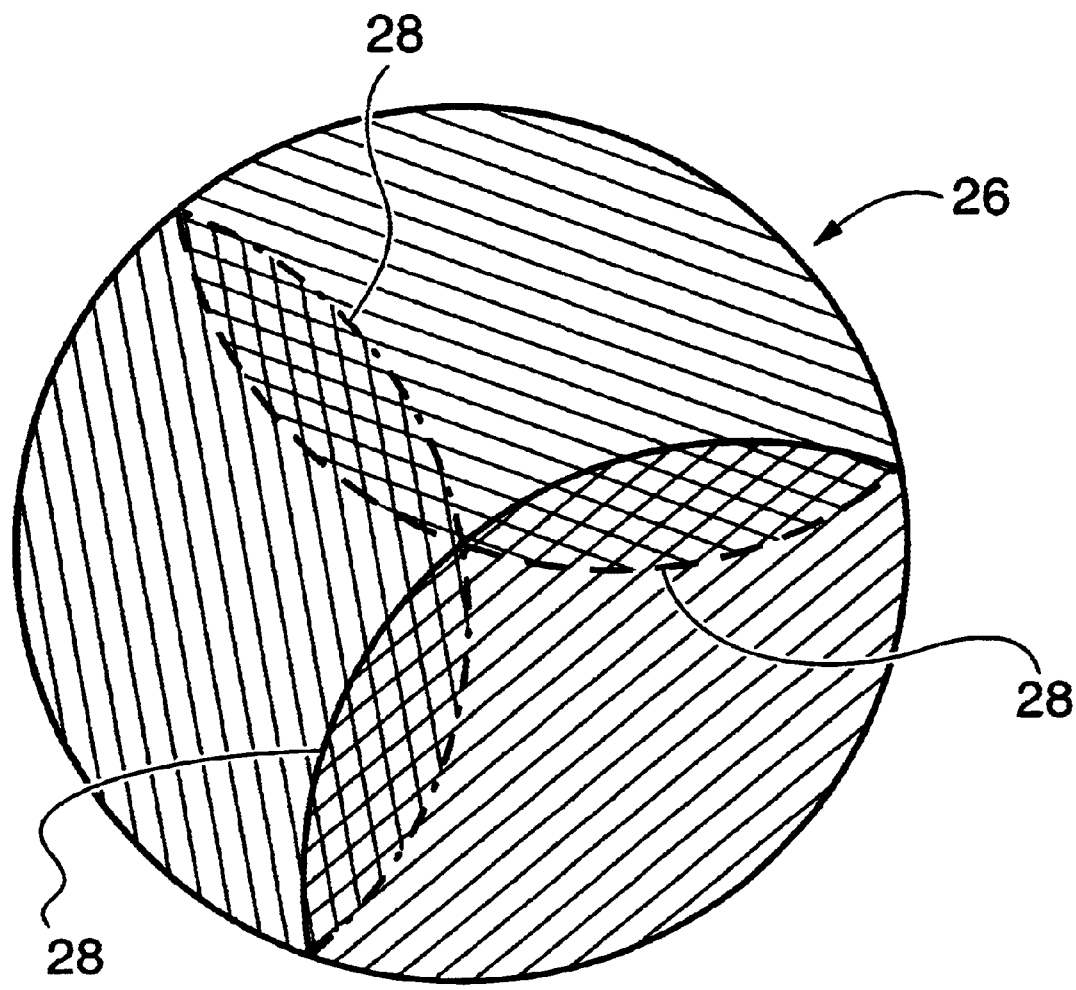
FIG. 3 is schematic diagram illustrating a hierarchical partitioning arrangement in the preferred system.

Similarly, as shown in FIG. 3, each loss group 26 is logically associated with one or more virtual connections 28. Connections that belong to the same loss group share the logically reserved buffer space of the corresponding partition group. Connections associated with a particular loss group may have maximum queue depths which are sized to logically overlap or intersect one another such that the buffer space defined by all of the connections within the particular loss group exceeds the size of the buffer space reserved to that loss group. As with loss groups, the maximum queue depths or buffer space allocated to connection may vary depending upon the cell loss priority value of a cell under consideration. The MRM 18 may also store cells associated with such connections in the shared space 24 (FIG. 2) under certain conditions as described in greater detail below.

Figure 4:
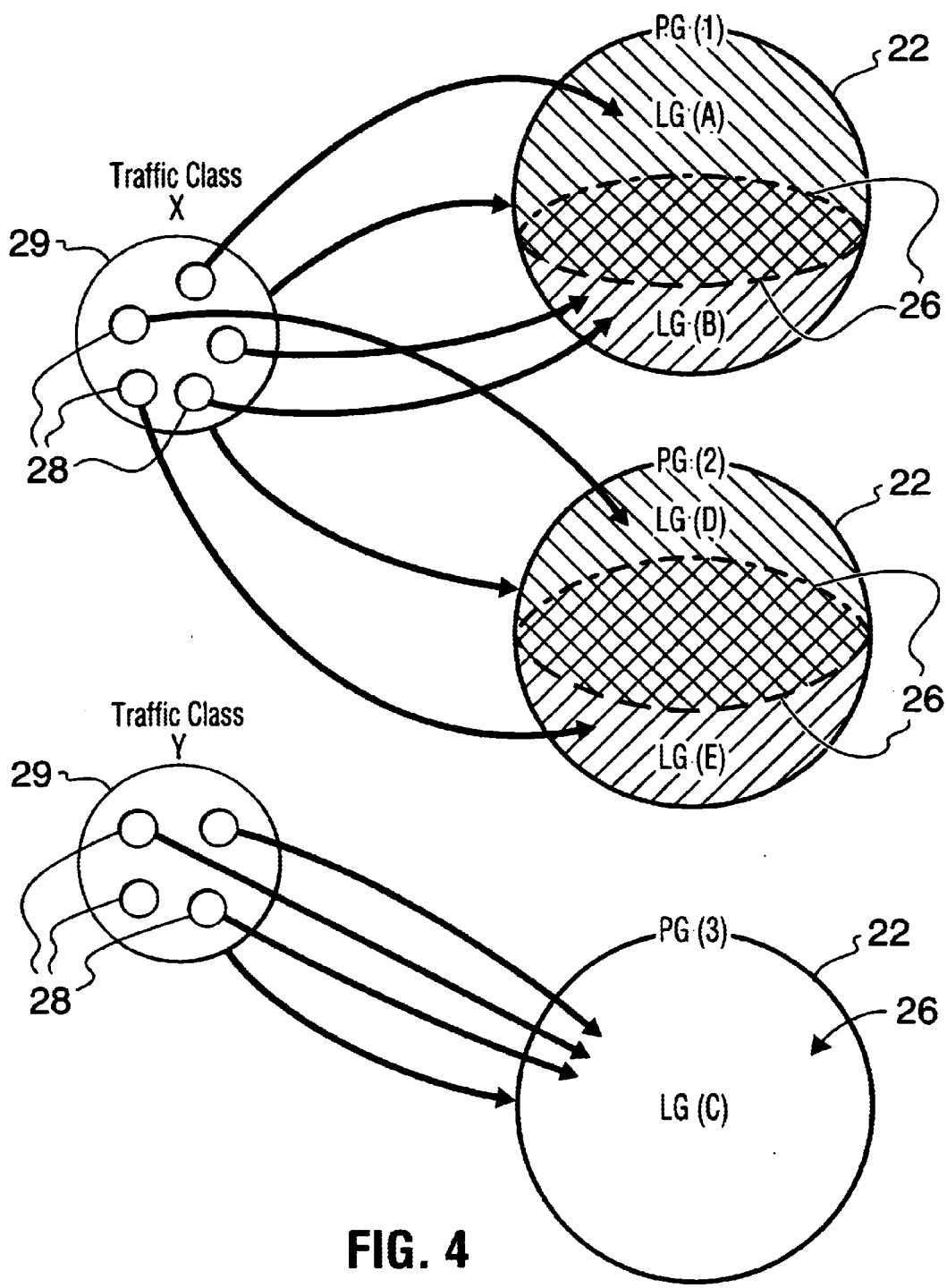
FIG. 4 is schematic diagram exemplifying how ATM communication protocol entities are mapped into the memory model of the preferred system.

As shown in FIG. 4, the MRM 18 provides a 1:m mapping or relationship between digital service or traffic classes, such as ATM QoS classes 29, and partition groups 22. (The MRM may also be configured for a 1:1 mapping between QoS classes and partition groups.) The MRM 18 also provides an m:1 mapping or relationship between virtual connections 28 and loss groups 26.

In the preferred embodiment, congestion is defined at three levels: (1) the connection level; (2) the loss group level; and (3) the partition group/shared space level. Referring to FIGS. 2 and 3, absolute limits, congestion indicators or thresholds and queue depth counters employed by the MRM 18 in relation to an ATM communication system are:
(1) Per Connection (CN)

$CN_{TCLP1}$—Connection CLP1 cell threshold. When the total number of cells of a particular connection stored in the memory 20 exceed this threshold, the connection is deemed to be experiencing connection level CLP1 congestion.

$CN_{TCLP0+1}$—Connection CLP0 and CLP1 (alternatively referred to as "CLP0+1") cell threshold. When the total number of cells of a particular connection stored in the memory 20 exceed this threshold, the connection is deemed to be experiencing (connection level) CLP0+1 congestion.

$CN_{MAX}$—Connection maximum cell queue depth limit. When exceeded all incoming cells or frames of this connection are discarded.

$CN_{QD\_C}$—Connection queue depth counter. Measures the instantaneous number of cells a connection has stored in the memory 20.

(2) Per Loss Group (LG)

$LG_{TCLP1}$—Loss group CLP1 cell discard threshold. When the total number of cells in the loss group exceeds this threshold, the loss group is deemed to be experiencing CLP1 congestion.

$LG_{TCLP0+1}$—Loss group CLP0/CLP1 cell discard threshold. When the total number of cells in the loss group exceed this threshold, the loss group is deemed to be experiencing CLP0+1 congestion.

$LG_{QD\_C}$—Loss group aggregated queue depth count. Aggregated queue depth of the cells of all connections that belong to the loss group.

$LG_{SS\_C}$—Loss group shared space count. Aggregated count of all cells from connections that belong to the loss group that are placed in the shared space.

(3) Per Partition Group (PG)

$PG_{RMIN}$—partition group minimum buffer reservation size. The minimum buffer space reserved to a particular partition group.

$PG_{SS\_MAX}$—partition group maximum shared space buffer limit. The maximum number of cells this PG is allowed to place in the shared space.

$PG_{SST}$—partition group shared space congestion threshold. When the total number of cells (from all connections) in the shared space exceed this threshold, 'global congestion' for this PG is declared.

$PG_{RMIN\_QD\_C}$—partition group reserved space cell count. Aggregated count of all cells in the reserved space of the partition group.

$PG_{SS\_C}$—partition group shared space cell count. Aggregated count of all cells from connections that belong to the partition group which are placed in the shared space.

(4) Shared Space (SS)

$SS_{QD\_C}$—Shared space occupancy counter. Aggregated queue depth of all cells in the shared space.

$SS_{MAX}$—Fixed size of shared space.

The MRM 18 must decide whether or not each arriving cell should be discarded or stored in the memory. Generally speaking, a cell is discarded only when (i) an absolute limit has been reached at any of the connection, loss group and partition group/shared space levels; and (ii) congestion is simultaneously experienced at the connection, loss group and partition group levels. Generally speaking, the absolute limits are set to ensure that a misbehaving connection cannot flood an ATM communications device, e.g., to prevent a misbehaving non-real time variable bit rate (nrt-VBR) connection from flooding a network node with CLP1 cells, as will be appreciated by those skilled in the art.

Figure 5A:
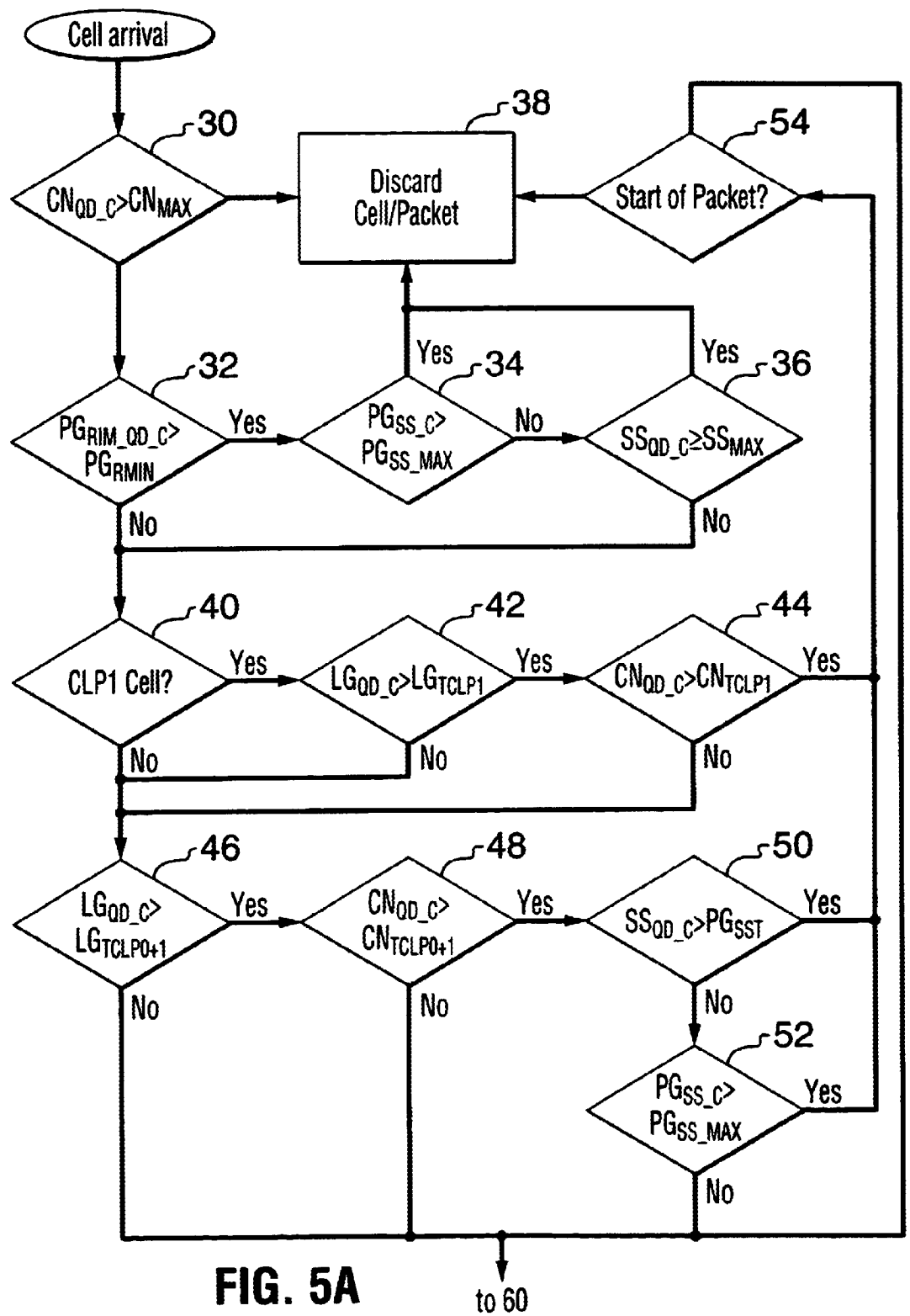
FIG. 5 is a flowchart showing the processing logic carried out by the preferred system.
Figure 5B:
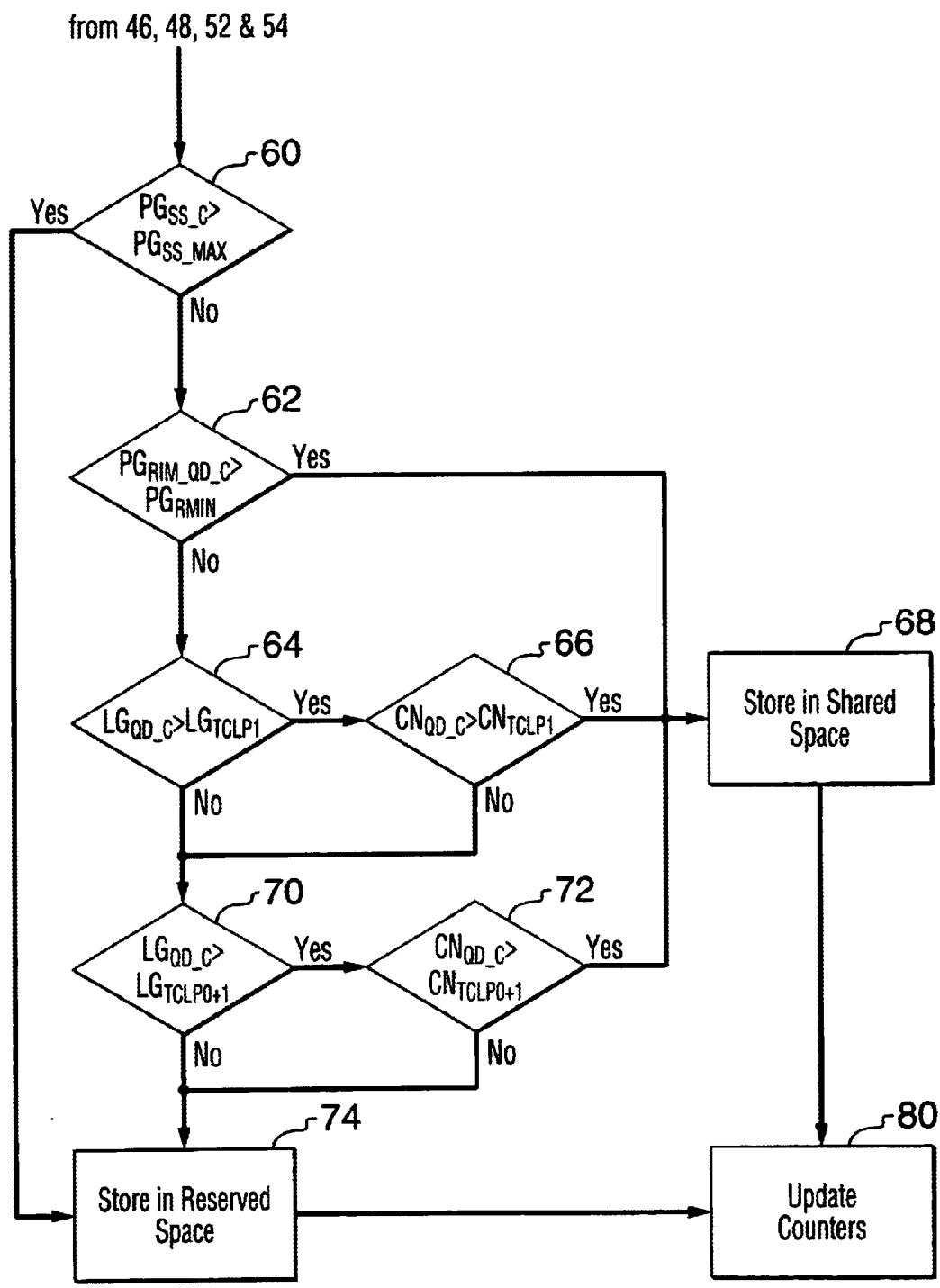

FIG. 5 illustrates the logic used by the MRM 18 to arrive at the store/discard decision in the event of a cell arrival. Referring to this figure, at a first step 30 the connection queue depth counter, $CN_{QD\_C}$, is compared against the maximum queue depth limit for the connection, $CN_{MAX}$. If $CN_{QD\_C}$ exceeds $CN_{MAX}$, then the ATM cell under consideration will be discarded at step 38. $CN_{MAX}$ sets an absolute limit on the queue size per connection and hence prevents any one connection from occupying all of the buffer space defined by the corresponding loss group. This limit causes a 'hard discard' and thus is preferably set to be quite high, e.g. 50% of the size of the corresponding loss group.

In steps 32, 34 and 36 the MRM 18 determines whether or not other limits or thresholds associated with the partition group corresponding to the cell under consideration and the shared space have been reached. At step 32, the partition group reserved space cell counter $PG_{RMIN\_QD\_C}$ is compared against the partition group reserved space threshold $PG_{RMIN}$. If the counter exceeds this threshold then the reserved buffer space allocated to the corresponding partition group is full. At step 34, the partition group shared space cell counter $PG_{SS\_C}$ is then compared against the partition group maximum shared space buffer limit $PG_{SS\_MAX}$. If this limit is also exceeded, then the partition group associated with the cell under consideration has already occupied a maximum permissible amount of memory by filling up the allotted reserved space and a maximum shared space limit and thus the cell is discarded at step 38. However, it is still possible that even though the maximum shared space limit for the particular partition group has not yet been reached the shared space 24 is nevertheless filled to capacity due to other connections and/or partition groups. Thus at step 36, the shared space queue depth counter $SS_{QD\_C}$ is compared against the shared space fixed size limit $SS_{MAX}$ associated with the particular partition group. If the results of this comparison indicated that the shared space 24 is filled to capacity, then the cell under consideration is discarded at step 38; otherwise control passes to step 40.

At step 40, the MRM 18 checks whether or not the ATM cell under consideration has its cell loss priority (CLP) header field set to 1, which indicates whether or not the cell is of low priority and may be discarded without affecting quality of service. If the cell is a CLP1 cell, then at step 42, the loss group queue depth counter $LG_{QD\_C}$ is compared against the loss group CLP1 cell discard threshold $LG_{TCLP1}$. If the size of the loss group in terms of the number of cells is less than this threshold, then control passes to step 46; otherwise, CLP1 loss group congestion is asserted and control passes to step 44. At step 44, the connection queue depth counter $CN_{QD\_C}$ is compared against the connection level CLP1 cell congestion threshold. If the queue depth of the connection exceeds the CLP1 threshold for the connection, then connection level CLP1 congestion is asserted and control passes to step 54 discussed in greater detail below. If the test at step 44 does not indicate the existence of connection level CLP1 congestion, then control passes to step 46.

At step 46, the loss group queue depth counter $LG_{QD\_C}$ is compared against the loss group cell discard threshold $LG_{TCLP0+1}$ in respect of CLP0 and CLP1 cells. If the $LG_{TCLP0+1}$ threshold is reached then CLP0+1 congestion is asserted for the loss group and control passes to step 48. At step 48, the connection queue depth counter $CN_{QD\_C}$ is compared against the connection level cell discard threshold $CN_{TCLP0+1}$ for CLP0 and CLP1 cells, i.e., CLP0+1 cell stream. If the $CN_{TCLP0+1}$ threshold is reached then CLP0+1 congestion is asserted at the connection level and control passes to step 50. At step 50, the shared space queue depth counter $SS_{QD\_SC}$ is compared against the partition group shared space threshold $PG_{SST}$. If the depth of the shared space (i.e., irrespective of which connections or partition groups are responsible for filling up the shared space) is greater than the threshold for the partition group associated with the cell under consideration, then the partition group is deemed to be experiencing shared space congestion, alternatively referred to as 'global congestion'. In this event, once congestion is experienced at the loss group, connection group and partition group/shared space levels (via steps 46, 48 and 50) then control passes to step 54. If, however, the particular partition group is not in a state of global congestion then control passes to step 52. (Note that a global congestion condition in one PG does not effect any other PG.) At step 52, the partition group shared space counter $PG_{SS\_C}$ which measures the number of cells this particular partition group has stored in the shared space is compared against the maximum shared space buffer limit $PG_{SS\_MAX}$ for the particular partition group. This test is carried out because even though the partition group is not in global congestion, it is still possible for the partition group to have exceed the absolute number of cells it is permitted to store in shared space. If this limit is passed, then control passes to step 54.

In the event that no connection level or loss group level or partition group/shared space level congestion is experienced, then control passes to step 60 (and following) in order to decide whether or not the cells should be logically stored in the reserved space allocated to the partition group or the shared space. However, if at step 44, 50 or 52 a decision is made to discard the cell, then control passes to step 54.

Step 54 is used to enforce one of a number of potential discard policies. In the preferred embodiment, each connection is configured at setup time with one of three possible discard schemes: 1) cell discard; 2) early packet discard (EPD); and 3) partial packet discard (PPD). The discard policy configuration is stored in the context memory 14 and submitted to the MRM 18 by the IPM 12 (FIG. 1). Under the cell discard policy, a "packet" is considered to be each individual cell. Under EPD or PPD, a "packet" is considered to be an ATM Adaptation Layer (AAL) frame which, as known to those skilled in the art, comprises a group of ATM cells which are marked or delimited in accordance with the particular AAL protocol employed. Thus, if the connection under consideration has been configured for cell discard, then the test at step 54 will be true in each case and control passes to step 38 which is operative to discard the cell under consideration.

However, if the connection under consideration is configured for early packet discard, then step 54 will only be true with respect to the first cell of the frame. In this case, the congestion level tests are only effectively applied at the start of the frame and so once a discard decision has been made step 38 operates to discard the entire frame, i.e., all of the forthcoming cells of the frame are discarded at step 38. However, if a decision is made at the beginning of the frame to accept the first cell thereof, then the flowchart, particularly steps 60 through 74 in respect of whether or not the cells should be stored in reserved space or shared space, is applied with respect to each and every cell of the frame.

If the connection under consideration is configured for partial packed discard, then step 54 is not applied (not shown) and instead if a decision has been made to discard a particular cell of a frame, then step 38 is operative to discard the remaining cells of the frame (except for in the case of the AAL5 protocol the last cell of a frame which is used as a marker to indicate the beginning of the next frame).

As mentioned, steps 60 through 74 are used to determine whether or not the cell under consideration should be logically stored in the shared space 24 or the reserved space allotted to the corresponding partition group 22. At step 60, the partition group shared space counter $PG_{SS\_C}$ which measures how many cells the partition group has stored in shared space is compared to $PG_{SS\_MAX}$, representing the absolute limit on the number of cells the partition group may store in the shared space. If this limit is exceeded then, since the reserved space allocated to this partition group has not yet filled to capacity (as determined by step 32 above), the cell is stored in the reserved space of the partition group at step 74. If the $PG_{SS\_MAX}$ limit has not been reached, then step 62 (which is similar to step 32) determines whether or not the reserved space allotted to the partition group is filled. If so, then the cell is stored in shared space at step 68. However, if room remains within the partition group or in the shared space, then steps 64 and 66 (which are applied only in the event the cell is a CLP1 cell) determine whether or not the loss group and connection level CLP1 thresholds are exceeded. If CLP1 congestion is experienced at the loss group and connection level, then the cell is stored in the shared space at step 68. If CLP1 congestion is not simultaneously experienced at the connection level and the loss group level, then control flows to step 70.

Steps 70 and 72 determine whether or not CLP0+1 congestion is experienced at the loss group and connection levels. If both levels experience congestion, then the cell under consideration is stored in shared space at step 68. Otherwise, the cell is stored in reserved space at step 74.

Once the cell has been stored in the memory, the various counters ($CN_{QD\_C}$, $LG_{QD\_C}$, $LG_{SS\_C}$, $PG_{RMIN\_QD\_C}$, $PG_{SS\_C}$ and $SS_{QD\_C}$) are updated at step 80 as will be apparent from the definitions thereof.

It should be understood from the forgoing that the QMM 16 (FIG. 1) does not necessarily store cells in a contiguous area of the physical memory 20 which has been labelled or otherwise set aside as being reserved space or shared space. Rather, the storage of cells in 'reserved space' or 'shared space' is a logical concept and evaluated by the various counters described above.

As will be noted from the foregoing description of the algorithm shown in FIG. 5, congestion thresholds at the connection, loss group and partition group levels function as 'soft' thresholds in that exceeding them does not automatically cause a cell under consideration to be discarded. This is due in part to the sequential tests for loss group and connection level CLP1 or CLP0+1 congestion. If desired, however, the CLP1 and/or CLP0+1 thresholds at one of these levels may be set to zero so that the congestion test at the other level is determinative of whether or not the cell is stored or discarded. For example, if $CN_{TCLP1}=0$ and $CN_{TCLP0+1}=0$ then the tests at steps 46 and 52 will always fail. Accordingly, when the loss group CLP1 congestion threshold $LG_{TCLP1}$, is exceeded, there will be a cell (or packet) discard. Similarly, when a loss group CLP0+1 congestion threshold is exceeded, incoming cells to the loss group will be discarded if the corresponding partition group is in global congestion. In this manner 'soft' congestion indicators or thresholds can be turned into 'hard discard' limits.

The reserved buffer space size $PG_{RMIN}$ of each partition group 22 is preferably selected to ensure minimum guaranteed QoS to the associated ATM traffic class. The determination of the requisite amount of buffer space will be known to those skilled in the art of performance traffic management. The shared space 24 thus represents memory which can be used to provide quality of service to traffic classes beyond the guaranteed minimum levels, in circumstances where cell discard would occur in the prior art hard-partitioned memory.

Note that this additional performance is not just a function of adding more physical memory. For instance, consider a memory space of ten (10) megabytes. Assume the communication architecture defines four (4) service classes, each requiring two (2) megabytes to guarantee minimum QoS over a relatively long period of time, i.e., a statistically significant time period. In a hard-partitioned memory scheme, each service class would receive 2.5 Mb of space. Thus, cell discard would occur whenever a service class required cell storage of more than 2.5 Mb. Under the principles of the preferred embodiment, however, each service class is allotted a reserved space ($PG_{RMIN}$) of 2 Mb. The shared space is thus allotted 2 Mb. With this type of system, it is possible for a service class to have up to 2 Mb of cell storage in the shared space in addition to the 2 Mb of reserved space for a total of 4 Mb. Thus, the preferred embodiment may be more capable of handling bursty traffic with potentially lower cell loss ratios then the prior art hard-partitioned memory.

The shared space 24 may thus be viewed as an 'idle' resource, the use of which is allocated amongst the various partition groups/traffic classes. The preferred embodiment provides a means for prioritizing this resource amongst the various partition groups/traffic classes through the use of the absolute partition group shared space limited $PG_{SS\_MAX}$ and/or the partition group shared space threshold $PG_{SST}$. The $PG_{SS\_MAX}$ threshold can typically be set relatively high for most traffic classes of most communication systems. For example, in a four (4) QoS class architecture, each partition group may have its $PG_{SS\_MAX}$ limit set to 60% of the size of the shared space 24.

Figure 6:
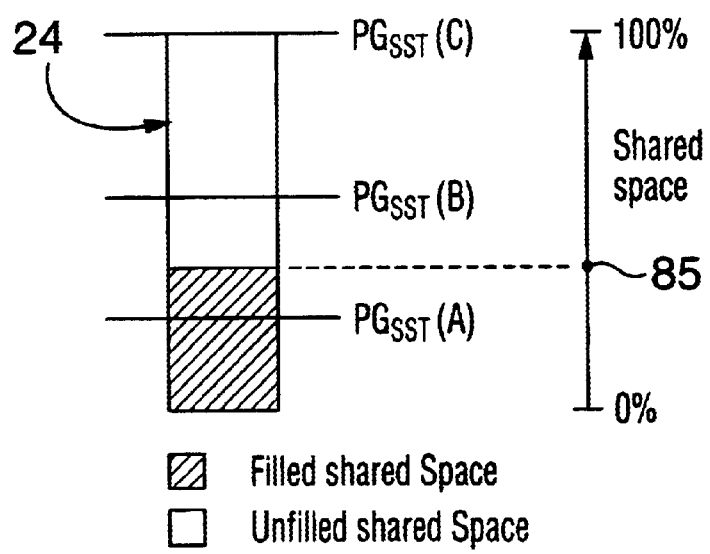
FIG. 6 is a schematic diagram of occupancy-based thresholds employed in the preferred system.

The $PG_{SST}$ threshold, which indicates whether or not a partition group is in a state of global congestion, provides a different measure of congestion. Unlike the $PG_{SS\_MAX}$ limit which is measured against the total number of cells a particular partition group 22 has stored in shared space 24, the $PG_{SST}$ threshold is measured against the total number of cells in the shared space, irrespective of which connection or partition group placed cells there. This is exemplified in FIG. 6 where three (3) partition groups A, B, C are assigned various $PG_{SST}$ levels as shown. These thresholds can be viewed as indicating congestion based on how much free space remains available in the shared space 24 at any instant of time. In the illustrated example, the depth or occupancy of the shared space (and complimentarily, the amount of free space remaining) has exceed the $PG_{SST}$ threshold for PG(A). Thus, if a connection associated with PG(A) has reached its "fair share" of buffer space by exceeding its connection and loss group thresholds, that connection is not able to store additional cells in the shared space, since it is congested. However, connections associated with PG(B) or PG(C) that have reached their fair share of buffer space are still able to store cells in the shared space.

It will also be noted that within a given partition group 22 a number of loss groups 26 can be defined. The various loss groups within a particular partition group enable various cell loss ratios (CLR) to be provided within the partition group which, in turn, maps into or is otherwise associated with one digital traffic class. This is because the CLR probability is:

$$P(CLR)=P(PG_{RMIN\_QD\_C}>PG_{RMIN})\cup P(LG_{QD\_C}LG_{TCLP0+1}) \quad [1]$$

where P( ) is the probability of an event. For a given load, the first PG term is common for all connections in a partition group, and the second LG term is common to all connections within a particular loss group of that partition group. The LG term, however, does not have to be equal for each loss group, and thus the probability of cell loss can be different for each loss group within the partition group. This capability is important for certain types of traffic classes, as described in greater detail below. Note that the LG thresholds must be hard, as described above, for equation [1] to be valid. Also note that when this equation is operative, cells stored in shared space represent a quality of service to connections above and beyond the minimum guaranteed QoS, without adversely affecting QoS guarantees to any other loss group.

In addition, it will also be noted from FIG. 2 that the loss groups 26 within a partition group 22 can be defined to collectively occupy a space larger then the buffer space allocated to the partition group. A similar situation occurs with the connection/loss group relationship as will be noted from FIG. 3. These overlapping regions enable an ATM communications device incorporating system 10 to take advantage of the bursty nature of ATM digital traffic and achieve a higher booked connection capacity (i.e., accepted connections) than would otherwise be possible if the memory 20 was not logically organized in this manner.

Furthermore, the MRM 18 allows the connection level thresholds $CN_{TCLP1}$ and $CN_{TCLP0+1}$ to be dynamically configured for available bit rate (ABR) and/or unspecified bit rate (UBR) connections through the use of periodically calculated equations. These equations are:

$$CN_{TCLP0+1} = k_{C0+1} * \frac{MCR_i}{\sum MCR_j} \quad [2]$$

where $k_{C1}$ and $k_{C0+1}$ are scaling constants, MCR refers to the weight, in this case the minimum cell rate of a connection, i indicates a particular connection under consideration, $$CN_{TCLP1} = k_{C1} * \frac{MCR_i}{\sum MCR_j}, \quad [3]$$

and j is an index into all 'active' connections, i.e., connections which have one or more cells stored in the memory 20, within a predefined group. This group may be the entire associated partition group, or a subset thereof, such as all active connections which use the same output port as the particular connection under consideration. Through the use of these equations the MRR 18 attempts to fairly distribute buffer space based on the number of active connections and the MCR proportions thereof. Thus, for instance, an ABR or UBR connection having an MCR twice as large as another connection will on average receive approximately twice as much buffer space. The above equations may be periodically calculated according to a predetermined time interval, number of cell arrivals, or, in the case of ABR, calculated wherever an explicit rate (ER) calculation is performed for a given ABR connection.

Equations [2] and [3] may also be extended to connections associated with other service categories. In such cases, the weight of the connection will be equal to its negotiated traffic rate.

System designers often have to balance the sharing of physical resources between various types of digital traffic and the isolation thereof. On the one hand, it is desired to share the physical memory resource as much as possible in order to minimize the cost thereof; on the other hand, it is desired to isolate the flow of one virtual connection or group thereof so as to prevent the impact thereof on the flow of other virtual connections. The preferred embodiment facilitates this balancing act by providing logical isolation at a variety of levels. In particular, the partition group facilitates isolation between traffic classes as a whole, the loss groups facilitates isolation between different groups of virtual connections within a traffic class having various CLRs, and the connection level thresholds isolate connections which may be non-conformant. These principles are illustrated in the discussion below of a preferred configuration for the buffering system relative to an ATM communications environment. Each ATM traffic class is separately discussed.

(1) Constant Bit Rate (CBR) Traffic

CBR traffic does not include any CLP1 cells and thus CLP1 thresholds may be ignored. CBR connections are preferably allotted at least one partition group. $PG_{RMIN}$ for each partition group is selected so that all connections associated therewith are provided with sufficient reserved buffer space to ensure that minimum quality of service guarantees are provided for over a statistically significant period. Since CBR traffic should have no cell loss, only one loss group is preferably defined within a CBR partition group, having a size equal to $PG_{RMIN}$. CBR traffic tends to be generally well-behaved. However, in the event of a non-conforming virtual connection, the $CN_{MAX}$ threshold precludes other CBR connections associated with the same PG/LG from being starved for memory resources. In addition, although CBR traffic tends to be non-bursty in nature due to strict cell delay variation constraints, CBR is nevertheless considered to be a premium ATM service and thus the $PG_{ST}$ and $PG_{SS\_MAX}$ thresholds for CBR partition groups are preferably set to the maximum sizes possible.

(2) Variable Bit Rate (VBR) Traffic (a) Real Time VBR (rt-VBR) Traffic

The system 10 is preferably configured for this traffic in a manner similar to CBR traffic described above.

(b) Non-real Time VBR (nrt-VBR) Traffic

The controller 11 maps nrt-VBR connections into one of three nrt-VBR connectivity groups, depending on the negotiated cell loss ratio guarantee. All nrt-VBR traffic is associated with one partition group, in which three (3) loss groups are defined, one for each of the nrt-VBR connectivity groups. Within each loss group, the $CN_{TCLP0+1}$ threshold for each connection is preferably set to zero so that the loss group thresholds function as a 'hard' threshold as discussed above. This configuration also isolates the connectivity groups from one another and provides the necessary truncation therebetween to enable equation [1] to be operative. Accordingly, each loss group has its $LG_{TCLP0+1}$ threshold set in accordance with a target CLR for the corresponding nrt-VBR connectivity group.

Furthermore, since nrt-VBR traffic tends to be bursty, the three (3) loss groups preferably define a logical buffer space larger than the partition group to take advantage of statistical multiplexing. Hence, if the shared space 24 remains relatively empty, each nrt-VBR subclass can enjoy a quality of service better than the minimum guaranteed QoS since the shared space is available to store cell overflow into the partition group.

The nrt-VBR traffic also include CLP1 cells. To handle these types of cells, the buffering system 10 is preferably configured such that the $CN_{TCLP1}$ threshold for each connection is set to zero, and the $LG_{TCLP1}$ threshold for each nrt-VBR subclass is set to a non-zero value. In this case then, the $LG_{TCLP1}$ threshold function as hard discard limits for aggregate connections.

(3) Unspecified Bit Rate (UBR) Traffic

In the preferred configuration, each communication port (or alternatively a group thereof) supporting UBR traffic is associated with a separate partition group having a single loss group. Each UBR PG/LG is set such that $PG_{RMIN}=0$, $LG_{TCLP0+1}=0$ and $LG_{TCLP1}=0$. This causes all UBR traffic to be stored only in the shared space 24. The global congestion threshold, $PG_{SST}$, for each such PG is set to be equal and relatively high compared to the size of the shared space. $PG_{SS\_MAX}$ is set relatively high. Each UBR connection is also preferably configured with a dynamic $CN_{TCLP0+1}$ threshold in accordance with equation [2]. The scaling factor $k_{C0+1}$ is preferably set equal to $$\frac{1}{2} * \frac{PG_{SST}}{\text{No. of Ports}}.$$

Thus, for instance, if $PG_{SST}=256$ k, $k_{C0+1}$ is equal to 32 k, and equation [2] reduces to $$CN_{TCLP0+1} = 32K * \frac{MCR_i}{\sum MCR_j}.$$

In this manner, each UBR-supporting port can store cells in the same shared memory space 24 while receiving a nominally equal share, e.g., 32 k, of one half of the shared buffer space. (The other half of the shared buffer space is nominally allocated to ABR traffic). Moreover, each connection of each port receives buffer space in proportion to its MCR relative to the sum of the MCRs of the other connections associated with the port.

A similar arrangement occurs with respect to UBR CLP1 cell streams. In this case, $LG_{TCLP1}$ for each partition group is set to zero, and the CLP1 threshold $CN_{TCLP1}$ is dynamically configured in accordance with equation [3]. The scaling factor $k_{C1}$ may be set to be a predetermined percentage of $k_{C0+1}$, e.g., 50%.

(4) Available Bit Rate (ABR) Traffic

In the preferred configuration, all ABR connections are assigned to a single partition group having a single loss group, with $LG_{TCLP0+1}$ being equal to $PG_{RMIN}$. $PG_{RMIN}$ is set to be relatively low, $PG_{SS\_MAX}$ is set relatively high, and $PG_{SST}$ is set to be as high, or higher, than that of UBR so that much of the shared space is available to ABR connections. Each ABR connection is provided with a dynamic $CN_{CLP0+1}$ threshold as defined in equation [2], with the scaling factor $k_{C0+1}$ being equal $$\frac{1}{2} * \frac{PG_{SST}}{\text{No. of Ports}}$$

so that each ABR connection is nominally apportioned buffer space in proportion to its MCR relative to the sum of the MCRs of other active ABR connections. ABR traffic comprises a negligible number of out-of-rate resource management CLP1 cells and thus the $LG_{TCLP1}$ and $CN_{TCLP1}$ thresholds are static and set relatively low.

Those skilled in the art will appreciate that numerous modifications and variations may be made to the embodiments and preferred configurations disclosed herein without departing from the spirit of the invention.

What is claimed is:

1. A buffering system for use in a digital communications device employing a connection-oriented protocol, said system comprising:
    a memory for storing messages;
    a controller connected to the memory for determining whether to store or discard messages based on predetermined discard criteria, and including means for storing messages in the memory,
    wherein the memory is logically partitioned into plural reserved buffer spaces of predetermined size allocated to predetermined groups of traffic flows and a shared buffer space, said groups of traffic flows being groups of virtual connections, each connection group being associated with a single class of communications traffic, and each virtual connection comprising stream of messages; and
    wherein the controller is enabled to logically fill each reserved buffer space to a predetermined state of congestion before logically storing messages belonging to the corresponding traffic group in the shared buffer space;
    wherein each traffic group is associated with a bound on its utilization of the shared buffer space and wherein a shared space congestion is asserted against a given traffic group when its corresponding bound is reached; and
    wherein connections are provisioned with a maximum connection queue depth limit and wherein said discard criteria includes the event of a given connection reaching an amount of stored messages equal to the corresponding maximum connection queue depth limit.

2. The system according to claim 1, wherein the shared space bound for a given traffic group comprises least one of (a) a limit on an absolute number of messages that the traffic group can store in the shared buffer space, and (b) a threshold relating to a degree of occupancy of the shared buffer space.

3. The system according to claim 1, wherein said controller is enabled to logically store a given message in the shared buffer space when the corresponding reserved buffer space is logically filled to capacity bat has not yet reached its predetermined congestion state.

4. The system according to claim 1, wherein the reserved buffer space congestion state includes the reserved buffer space being filled to capacity.

5. The system according to claim 1, wherein the discard criteria includes a reserved buffer space reaching its congestion state and shared space congestion is asserted against the corresponding traffic group.

6. The system according to claim 1, wherein each reserved buffer space is sized to provide a minimum quality of service to the corresponding group of connections.

7. The system according to claim 1, wherein the maximum connection queue depth limit for a given connection is dynamic, being proportional to a weight associated with the given connection and inversely proportional to a sum of weights associated with a predefined group of connections.

8. The system according to claim 1, wherein at least one said connection group is further logically subdivided into one or more sub-groups, each sub-group being provisioned with a size threshold for the number of messages that the connections thereof may store in the memory, and wherein said reserved buffer space congestion state includes the state of a sub-group size threshold associated with a particular message being reached.

9. The system according to claim 8, wherein plural sub-group size thresholds of a given connection group define in aggregate a logical memory space larger than the buffer space allotted to the given connection group.

10. The system according to claim 8, wherein at least one said connection group is further logically subdivided into one or more sub-groups, each sub-group being provisioned with a size threshold for the number of messages that the connections thereof may store in the memory, and wherein said discard criteria includes the event that the sub-group size threshold associated with a given message is reach and shared space congestion is asserted against the corresponding connection group.

11. The system according to claim 1, wherein at least one connection is provisioned with a size threshold for the number of messages that the connection may store in the memory, and wherein said reserved buffer space congestion state includes the event that the connection size threshold associated with a given message is reached.

12. The system according to claim 1, wherein at least one connection is provisioned with a size threshold for the number of messages that the connection may store in the memory, and wherein said discard criteria includes the event that the connection size threshold associated with a given message is reached and shared space congestion is asserted against the corresponding connection group.

13. The system according to claim 1, wherein:
    at least one said connection group is further logically subdivided into one or more sub-groups of connections, each sub-group being provisioned with a size threshold for the number of messages that the connections thereof may logically have stored in the memory,
    connections within said connection sub-group are separately provisioned with a size threshold for the number of messages that may be stored in the memory for those connections, and said reserved buffer space congestion state includes the associated sub-group size threshold being reached and the associated connection size threshold being reached for a given message.

14. The system according to claim 1, wherein:

at least one said connection group is further logically subdivided into one or more sub-groups of connections, each sub-group being provisioned with a size threshold for the number of messages that the connections thereof may logically have stored in the memory, connections within said connection sub-group are separately provisioned with a size threshold for the number of messages that may be stored in the memory for those connections, and said discard criteria includes the event that the size threshold of a given connection is reached, the size threshold of the corresponding sub-group is reached, and shared space congestion is asserted against the corresponding connection group.

15. The system according to claim 1, wherein the connection orientated protocol is an asynchronous transfer mode (ATM) communications protocol, and said messages are ATM cells.

16. The system according to claim 15, wherein connections are provisioned with a maximum connection queue depth limit and wherein said congestion criteria includes the event of a given connection reaching an amount of stored messages equal to the corresponding maximum connection queue depth limit.

17. The system according to claim 16, wherein the maximum connection queue depth limit for a given connection associated with a minimum cell rate is dynamic, being proportional to the minimum cell rate of the given connection and inversely proportional to a sum of minimum cell rates associated with a predefined group of connections.

18. The system according to claim 17, wherein the given connection is associated with a communications port and the predefined group of connections includes all active connections of thie same class as the given connection which are associated with the same communications port.

19. The system according to claim 18, wherein connections are configurable for at least one of cell discard, partial frame discard and early frame discard, and the controller is enabled to respectively perform at least one of cell discard, partial frame discard and early frame discard.

20. The system according to claim 15, wherein:

at least one said connection group is further logically subdivided into one or more sub-groups of connection, each sub-group being provisioned with a size threshold for the number of cells that the connections thereof may logically have stored in the memory, connections within said connection sub-group arm separately provisioned with a size threshold for the number of cells that may be stored in the memory, and said reserved buffer space congestion state includes the associated sub-group size threshold being reached and the associated connection size threshold being reached for a given cell.

21. The system according to claim 20, wherein said discard criteria includes the event that the size threshold of a given connection is reached, the size threshold of the corresponding sub-group is reached, and shared space congestion is asserted against the corresponding connection group.

22. The system according to claim 20, wherein said sub-group size threshold and said connection size threshold vary depending on the cell loss priority of a cell under consideration.

23. The system according to claim 20, wherein the sub-group size thresholds of a given connection group define in aggregate a logical space larger than the buffer space allocated thereto.

24. The system according to claim 20, wherein connections are configurable for at least one of cell discard, partial frame discard and early frame discard, and the controller is enabled to respectively perform at least one of cell discard, partial frame discard and early frame discard.

25. A buffering system for use at a queueing point in a digital communications device, said system comprising:

a memory for storing messages;

a controller connected to the memory for determining whether to store or discard messages based on predetermined discard criteria, and including means for storing messages in the memory, said memory being logically partitioned into plural reserved buffer spaces allocated to groups of traffic flows and a shared buffer space, wherein each said traffic group is associated with a bound on the utilization of the shared space access restriction, said traffic groups being further logically subdivided into one or more sub-groups, each sub-group being provisioned with a size threshold for the number of messages that the sub-group may store in the memory, wherein said discard criteria in respect of a given message includes the corresponding sub-group size threshold being reached and the corresponding traffic group shared space utilization bound being reached, and wherein the sub-group size thresholds of a given traffic group define in aggregate a logical space larger than the buffer space of the given traffic group.

26. The system according to claim 25, wherein the shared space bound for a given traffic group comprises least one of (a) a limit on an absolute number of messages that the connectivity group can store in the shared buffer space, and (b) a threshold relating to a degree of occupancy of the shared buffer space.

27. The system according to claim 25, wherein said traffic groups comprise groups of virtual connections, wherein connections within a given connection group are separately provisioned with a size threshold for the number of messages that may be stored in the memory, and wherein said discard criteria includes a given connection size threshold being reached, the corresponding traffic sub-group size threshold being reached, and the corresponding traffic group shared space bound being reached.

28. The system according to claim 27, wherein the connection size threshold for a given connection is dynamic, being proportional to a weight associated with the given connection and inversely proportional to a sum of weights associated with a predefined group of connections having similar quality of service characteristics.

29. The system according to claim 28, wherein said traffic sub-group size threshold and said connection size threshold vary depending on a priority level of a given message.

30. A buffering system for use in a communications device employing a connection-orientated communications protocol, said system comprising:

a memory for storing digital messages associated with various connections;

a controller connected to the memory for determining whether to store or discard a given message based on predetermined discard criteria, including the event that a given connection reaches an amount of stored messages equal to a dynamic maximum connection queue depth limit which is proportional to a weight associated with the given connection and inversely proportional to a sum of weights associated with a predefined group of connections.

31. The system according to claim 30, wherein the connection orientated protocol is an asynchronous transfer mode (ATM) communications protocol, said messages are ATM cells, and said weight is a minimum cell rate.

32. The system according to claim 31, wherein the given connection is associated with a communications port and the predefined group of connections includes all active connections of the same class as the given connection which are associated with the same communications port.

33. A method of buffering digital messages at a queueing point in a digital communications device employing a connection-orientated protocol, the method comprising:

logically partitioning a memory into plural reserved buffer spaces allocated to predetermined groups of traffic flows and a shared buffer space, said traffic groups being groups of virtual connections, each virtual connection group being associated with a single class of communications traffic, and each virtual connection comprising a stream of messages;

determining whether to store or discard a given message based on predetermined discard criteria; and logically filling the reserved buffer spaces of predetermined size to a predetermined state of congestion before logically storing messages in the shared buffer space provided the given message is not discarded; and wherein connections are provisioned with a maximum connection queue depth limit and wherein said discard criteria includes the event of a given connection reaching an amount of stored messages equal to the corresponding maximum connection queue depth limit.

34. The method according to claim 33, wherein each said traffic group is associated with a bound on its utilization of the shared space and wherein a shared space congestion is asserted against a given traffic group when its shared space bound is reached.

35. The method according to claim 34, wherein the shared space bound for a given traffic group comprises one of (a) a limit on an absolute number of messages that the traffic group can store in the shared buffer space, and (b) a threshold relating to a degree of occupancy of the shared buffer space.

36. The method according to claim 34, including the step of storing a given message in the shared buffer space when the corresponding reserved buffer space is logically filled to capacity but has not yet reached its predetermined congestion state.

37. The method according to claim 34, wherein said reserved buffer space congestion state includes the reserved buffer space being filled to capacity.

38. The method according to claim 34, wherein said discard criteria includes a reserved buffer space reaching its congestion state and shared space congestion being asserted against the corresponding traffic group.

39. The method according to claim 38, wherein each reserved buffer space is sized to provide a minimum quality of service to the corresponding group of connections.

40. The method according to claim 33, wherein the maximum connection queue depth limit for a given connection is dynamic, being proportional to a weight associated with the given connection and inversely proportional to a sum of weights associated with a predefined group of connections.

41. The method according to claim 33, wherein at least one said connection group is further logically subdivided into one or more subgroups, each sub-group being provisioned with a size threshold for the number of messages that the connections thereof may store in the memory, and wherein said reserved buffer space congestion state includes the state of a sub-group size threshold associated with a particular message being reached.

42. The method according to claim 41, wherein plural sub-group size thresholds of a given connection group define in aggregate a logical memory space larger than the buffer space allotted to the given connection group.

43. The method according to claim 33, wherein at least one said connection group is further logically subdivided into one or more sub-groups, each sub-group being provisioned with a size threshold for the number of messages that the connections thereof may store in the memory, and wherein said discard criteria includes the event that the sub-group size threshold is reached and shared space congestion is asserted against the corresponding connection group.

44. The method according to claim 33, wherein:

at least one said connection group is further logically subdivided into one or more sub-groups of connections, each sub-group being provisioned with a size threshold for the number of messages that the connections thereof may logically have stored in the memory, connections within said connection sub-group are separately provisioned with a size threshold for the number of messages that may be stored in the memory, and said reserved buffer space congestion state includes the associated sub-group size threshold being reached and the associated connection size threshold being reached for a given message.

45. The method according to claim 34, wherein:

at least one said connection group is further logically subdivided into one or more sub-groups of connections, each sub-group being provisioned with a size threshold for the number of messages that the connections thereof may logically have stored in the memory, connections within said connection sub-group are separately provisioned with a size threshold for the number of messages that may be stored in the memory, and said discard criteria includes the event that the size threshold of a given connection is reached, the size threshold of the corresponding sub-group is reached, and shared space congestion is asserted against the corresponding connection group.

* * * * *